United States Patent [19]
Molloy

[11] 3,940,193
[45] Feb. 24, 1976

[54] ROLLER BEARING SEPARATOR

[75] Inventor: Edward W. Molloy, Port Clinton, Ohio

[73] Assignee: General Motors Corporation, Detroit, Mich.

[22] Filed: Jan. 30, 1974

[21] Appl. No.: 437,789

Related U.S. Application Data

[63] Continuation of Ser. No. 356,772, May 3, 1973, abandoned.

[52] U.S. Cl.............. 308/218; 308/214; 29/148.4 C
[51] Int. Cl.².................... F16C 33/00; B21D 53/12
[58] Field of Search .......... 308/214, 217, 218, 202, 308/211; 29/148.4 C, 148.4 A, 148.4 R

[56] References Cited
UNITED STATES PATENTS

| | | | |
|---|---|---|---|
| 1,395,244 | 11/1921 | Andre................................ | 308/218 |
| 1,402,071 | 1/1922 | Huther............................... | 308/218 |
| 1,427,520 | 8/1922 | Close ................................. | 308/218 |
| 3,133,770 | 5/1964 | Cowles............................... | 308/218 |
| 3,365,775 | 1/1968 | Cavagnero et al.................. | 308/217 |

FOREIGN PATENTS OR APPLICATIONS

| | | | |
|---|---|---|---|
| 872,700 | 4/1953 | Germany ........................... | 308/218 |
| 1,959,378 | 2/1967 | Germany ........................... | 308/218 |

Primary Examiner—M. Henson Wood, Jr.
Assistant Examiner—Richard A. Bertsch
Attorney, Agent, or Firm—F. J. Fodale

[57] ABSTRACT

An angular contact roller bearing has a sheet metal separator guiding rollers revolving on inclined axes in an orbital movement around the longitudinal axis of the bearing. The sheet metal separator is made from a ladder shaped strip of sheet metal with the cross bars in an angular orientation which is rolled to an annular form with axially spaced cylindrical end rings of equal diameter. The cross bars may be configured to provide roller retainment in either or both radial directions as exemplified by the three embodiments disclosed. In one embodiment one of the cylindrical end rings cooperates with one bearing race to provide a unit handled subassembly with retained rollers. As disclosed in the specification, the cylindrical end rings may also be used to center the separator from one of the races if such a feature is desired.

13 Claims, 18 Drawing Figures

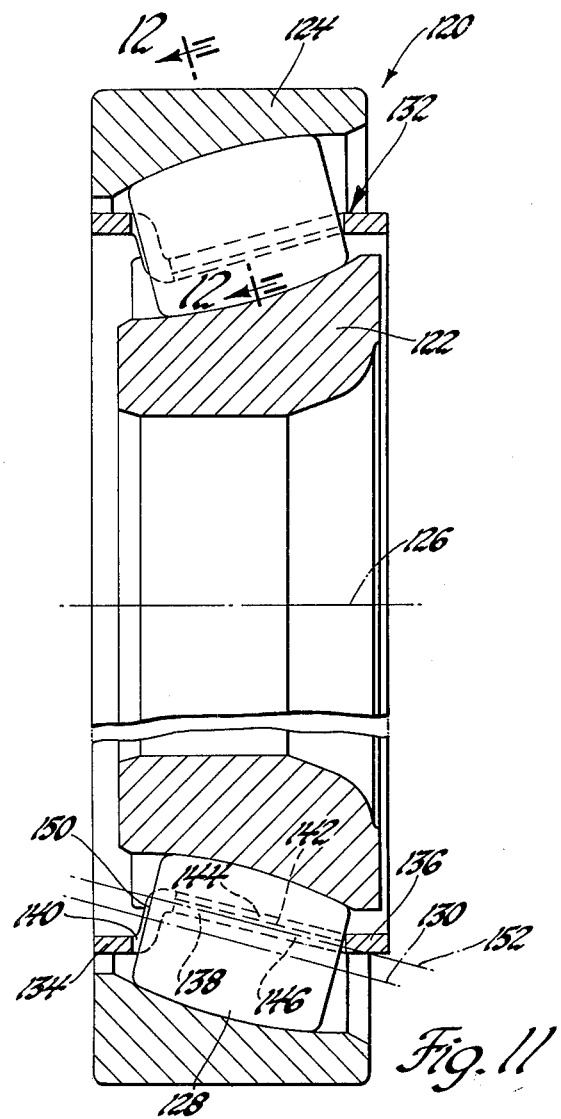
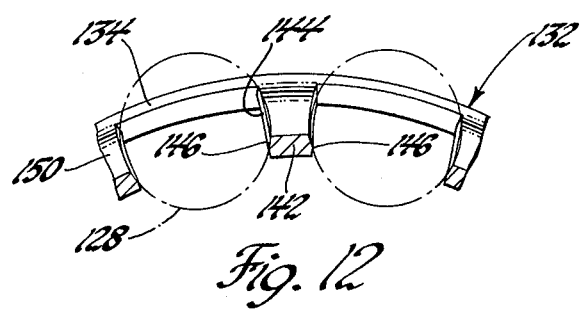
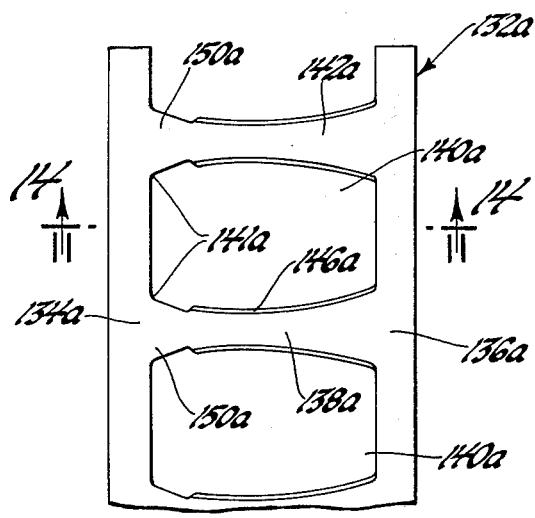
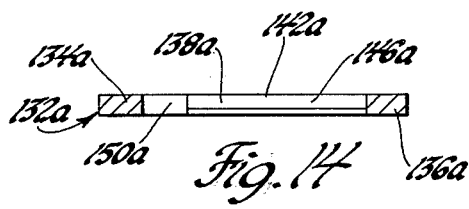
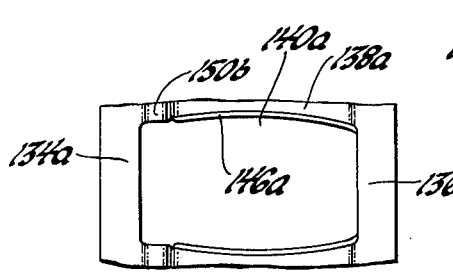
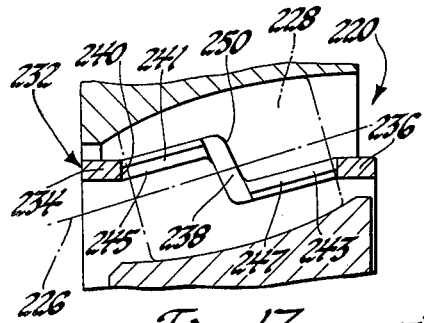
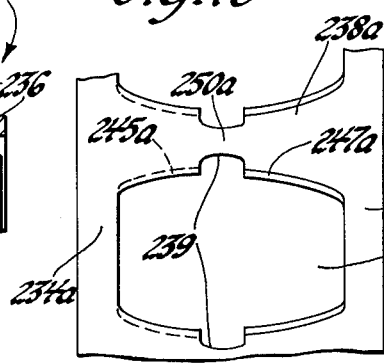
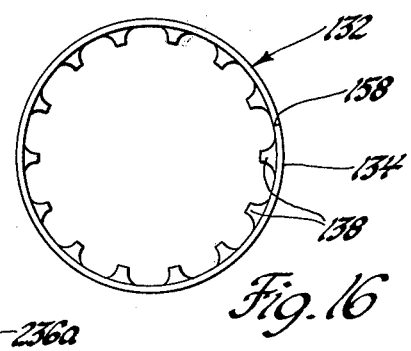

ROLLER BEARING SEPARATOR

This application is a continuation of U.S. patent application Ser. No. 356,772 filed May 3, 1973, now abandoned.

This invention relates generally to angular contact roller bearings and more specifically to such a bearing having a sheet metal separator and a method of making sheet metal separators.

Angular contact roller bearings with "drawn cup" sheet metal separators are already known. The "drawn cup" sheet metal separators are made by drawing a frustoconical cup, punching out the bottom wall and piercing roller receiving windows in the side wall. The generally frustoconical separator thus provided has inclined large diameter and small diameter end rings connected by inclined cross bars properly oriented for guiding the rollers on their inclined axis. The cross bars are usually straight in axial section, although bent cross bars have been proposed to provide two way retention as is shown in U.S. Pat. No. 3,133,770 issued to J. H. Cowles on May 19, 1964 for a "Roller Retainer For Tapered Bearings". In any event, the "drawn cup" method of making sheet metal separators for angular contact bearings results in scrap which generally outweighs the finished separator by about two-to-one.

On the other hand, sheet metal separators for radial roller bearings, that is, roller bearings in which the roller axes are parallel to the longitudinal axis of the bearing, are generally made by the "rolled strip" method which produces much less scrap. More specifically, sheet metal separators for radial roller bearings are made by piercing a series of windows in a flat strip of stock producing a ladder shaped strip which is then rolled into an annulus. In this process the cross bars between the windows connecting the end rings can be straight but often are bent for various purposes such as increased roller retainment into a configuration which by nature is symmetrical to the center plane of the separator.

The advantage of the "rolled strip" method over the "drawn cup" method in terms of material savings has long been recognized and various attempts have been made to apply the "rolled strip" method to the manufacture of sheet metal separators for angular contact bearings. See for instance the U.S. Pat. No. 1,446,487 issued to H. H. Timken on Feb. 27, 1923 for a "Roller Bearing Cage and Method of Making Same" and the U.S. Pat. No. 3,365,775 issued to E. V. Cavagnero et al. on Jan. 30, 1968 for a "Method of Making Bearing Separators and the Like". In both of these prior attempts, however, the general approach is to first make a sheet metal separator as though it were for a radial roller bearing and then to subsequently modify the separator into a generally frustoconical form such as by coning the separator in the instance of the Timken patent or by scalloping one of the end rings to a small effective diameter as in the instance of the Cavagnero et al. patent. These approaches, however, have the drawback that the separator end rings are subjected to severe forming pressures which makes it extremely difficult to maintain concentricities and tolerances in the separator for efficient roller guidance and retainment. Also the angular orientation of the end rings resulting from these methods makes it difficult to retain the separator in assembly with one race or to center the separator from one race if either of these features is desired. In the case of the Cavagnero separator with its scalloped end ring, centering of the separator from a race ring is highly impracticable if not impossible and this scalloped end ring obviously cannot be realistically used for cooperative retainment with a race.

An object of my invention is to provide an angular contact roller bearing with a sheet metal separator improved in terms of material savings and/or roller guidance.

Another object of my invention is to provide an improved "rolled ladder" method of making sheet metal separators for angular contact roller bearings.

Yet another object of my invention is to provide an angular contact roller bearing with a sheet metal separator improved by making the separator by an improved "rolled ladder" method.

Other objects and features of the invention will become apparent to those skilled in the art as the disclosure is made in the following detailed description of several embodiments of the invention as illustrated in the accompanying sheets of drawing in which:

FIG. 11 is an axial cross section of an angular contact roller bearing having barrel shaped rollers and a sheet metal separator showing a second embodiment of my invention.

FIG. 12 is a section taken along the line 12—12 of FIG. 11 showing the relationship between the separator cross bars and the barrel rollers at the maximum center diameter of the barrel shaped rollers.

FIG. 13 is a plan view of a portion of a flat strip with pierced windows from which the separator shown in FIG. 11 is made.

FIG. 14 is a view taken along the line 14—14 of FIG. 13 showing the side face of a typical cross bar.

FIG. 15 is a plan view similar to FIG. 13 showing the strip after the cross bars have been bent.

FIG. 16 is a front axial schematic view of a proper length strip rolled to annular form.

FIG. 17 is an axial section of an angular contact roller bearing having barrel rollers and a sheet metal cage showing a third embodiment of my invention.

FIG. 18 is a plan view of a portion of a flat strip with pierced windows from which the separator shown in FIG. 17 is made.

Figure 1:
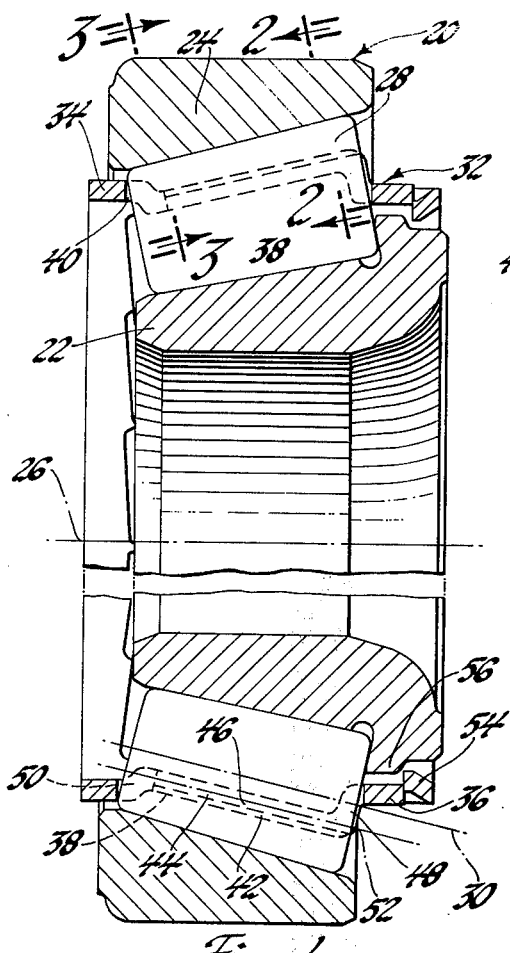
FIG. 1 is an axial section of an angular contact roller bearing having tapered rollers and a sheet metal separator showing a first embodiment of my invention.

Referring now to the drawings and more particularly to FIG. 1, a tapered roller bearing indicated generally at 20 comprises an inner race 22 and an outer race 24 concentrically disposed about a longitudinal axis 26. A series of frustoconical or tapered rollers 28 engage the races and revolve an axes 30 in an orbital movement around the longitudinal axis 26 as the races rotate relative to each other during operation of the bearing. The roller axes 30 are inclined or angularly related to the longitudinal axis 26 of the bearing thus describing an imaginary conical surface as the rollers revolve and orbit.

A sheet metal separator indicated generally at 32 comprises axially spaced end rings 34 and 36 connected by a series of cross bars 38 defining windows 40 receiving and circumferentially spacing the rollers 28. The end rings 34 and 36 are cylindrical and of equal diameter with the cross bars 38 angularly oriented to provide suitable guidance for the angularly oriented tapered rollers 28. More specifically the angularly oriented cross bars 38 comprise an elongated central portion 42 which is inclined with respect to the longitudinal axis 26 of the bearing 20.

Figure 2:
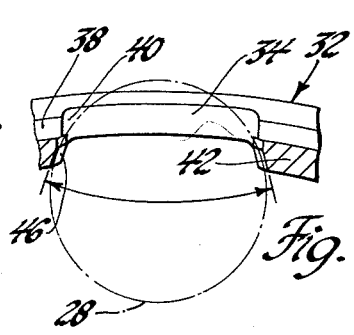
FIG. 2 is a section taken along the line 2—2 of FIG. 1 showing the relationship between the separator cross bars and a typical tapered roller adjacent the large diameter end of the roller.
Figure 3:
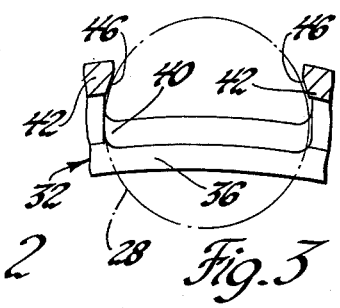
FIG. 3 is a section taken along the line 3—3 of FIG. 1 showing the relationship between the separator cross bars and the tapered roller adjacent the small diameter end of the roller.

In the first embodiment of my invention, the inclined central portions 42 of the cross bars 38 are located outwardly of the imaginary conical surface defined by the roller axes 30 and have side faces 44 provided with flat roller guiding surfaces 46 which engage the rollers 28 in a line contact. The roller guiding surfaces 46 on adjacent cross bars slant toward each other in the radially outward direction and are spaced to retain the rollers 28 in the windows 40 in the absence of the outer race 24. See FIGS. 2 and 3. The roller guiding surfaces 46 are shown as extending along the entire length of the inclined central portions 42 so that they guide and retain the rollers 28 for nearly their entire length. The roller guiding surfaces 46, however, need not necessarily be uninterrupted and in some instances separate guiding surfaces near the respective ends of the rollers 28 may be sufficient. In any event the inclined central portions 42 necessarily extend for a majority of the length of the cross bars 38 for adequate roller guidance irrespective of the nature of the roller guiding surfaces 46.

The inclined central portions 42 are connected to the end ring 36 by a generally radial S-shaped portion 48 which protrudes radially outwardly from the end ring 36 in order to provide a transition between the equal cylindrical nature of the end rings 34 and 36 and the inclined nature of the cross bars 38. At the opposite ends the inclined central portions 42 are connected to the other end ring 34 by a smaller generally radial S-shaped portion 50 which extends radially inwardly from the end ring 34. However, in some instances it may be necessary only to bend the cross bars 38 slightly in the radial outward direction at their connection to the end ring 36 in order to give the central portions 42 the proper inclinations. The inclination of the central portions 42 indicated by the lines 52 need not necessarily duplicate that of the roller axes 30. In the bearing shown in FIG. 1, the inclination of the central portions 42 forms a slightly more acute angle with the longitudinal axis 26 than does a typical roller axis 30 because of the roller retainment feature and the tapered nature of the rollers 28.

The end ring 36 includes a number of circumferentially spaced lanced tabs 54 resilient enough to snap past a thrust shoulder 56 at the large diameter end of the inner race 22 and yet rigid enough to thereafter cooperate with the shoulder 56 to retain the separator 32, rollers 28 and inner race 22 in a unit handled subassembly in the absence of the outer race 24.

Figure 4:
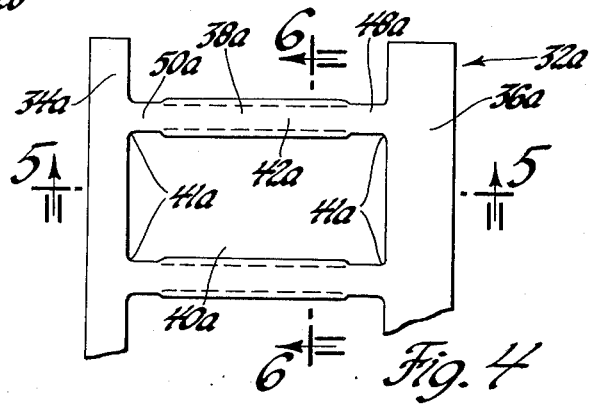
FIG. 4 is a plan view of a portion of a flat blank strip with pierced windows from which the sheet metal separator shown in FIG. 1 is made.
Figure 5:
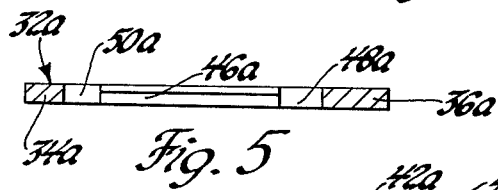
FIG. 5 is a section taken along the line 5—5 of FIG. 4 showing the side face of a typical cross bar.
Figure 6:
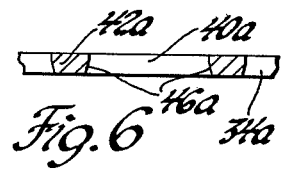
FIG. 6 is a section taken along the line 6—6 of FIG. 4 showing a section through the cross bar.

Referring now to FIGS. 4, 5 and 6, the separator 32 shown in FIG. 1 is made in the following manner. A series of windows 40a is first punched from a flat strip 32a of sheet metal into a "ladder" having flat end bands 34a and 36a interconnected by flat cross bars 38a. The windows 40a are pierced out with localized confronting enlargements 41a at the ends thereof such that the opposite side faces at end portions 48a and 50a of the cross bars 38a are relieved for avoiding interference of the completed cage with the rollers 28 and at the same time the end portions 48a and 50a of the cross bars are thinned for easier bending later on.

Figure 7:
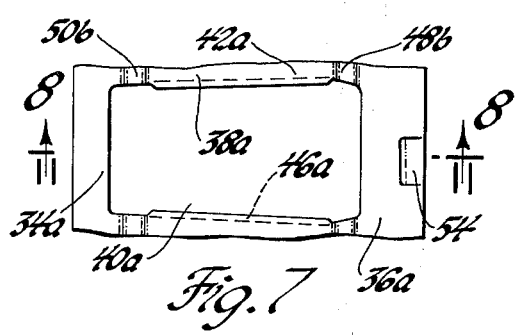
FIG. 7 is a plan view of the blank strip portion shown in FIG. 4 after the cross bars have been bent.
Figure 9:
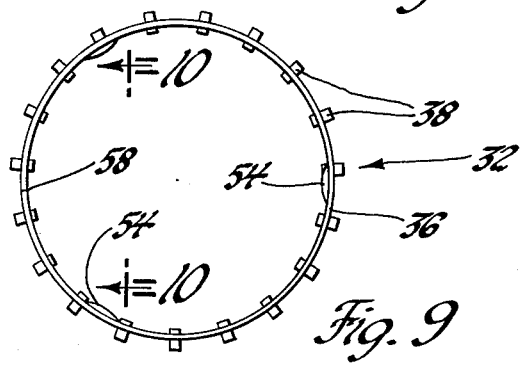
FIG. 9 is a front axial view, schematic in nature, showing a pierced and bent strip of requisite length rolled into a hoop to form the generally annular separator shown in FIG. 1.
Figure 8:
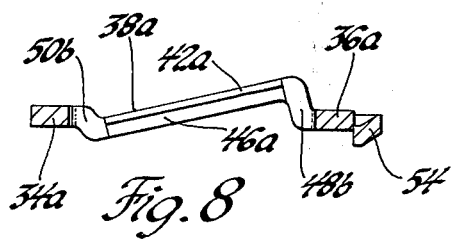
FIG. 8 is a section taken along the line 8—8 of FIG. 7 showing a typical cross bar after being bent.
Figure 10:
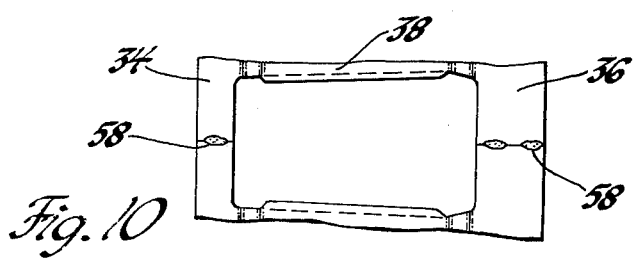
FIG. 10 is a view taken along the line 10—10 of FIG. 9 showing the abutting ends of the rolled strip.

The enlarged central portions 42a of the cross bars 38a are also preferably coined producing slanted surfaces 46a on their side faces which eventually engage the rollers of the bearing in a line contact. After the strip 32a is pierced and coined, the cross bars 38a are then bent at the thinned end portions 48a and 50a shown in FIGS. 4, 5 and 6 so that the enlarged central portions 42a are inclined with respect to the end bands 34a and 36a and connected thereto by the upright S-shaped portions 48b and 50b formed from the end portions 48a and 50a. See FIGS. 7 and 8. The lanced tabs 54 in the end band 36a shown in FIGS. 7 and 8 may be pierced simultaneously with the piercing of the windows 40a and bent simultaneously with the bending of the cross bars 38a or they may be provided by separate operations. However, in either event the lanced tabs are preferably formed while the end band 36a is flat. After the cross bars 38a are bent as shown in FIGS. 7 and 8, a strip of requisite length is rolled to annular form as schematically shown in FIG. 9 with the ends of the strip in abutting engagement. The abutting ends of the rolled strip are then resistance welded as indicated at 58 in FIG. 9 and shown more clearly in FIG. 10.

A second embodiment of my invention is shown in FIG. 11 wherein the angular contact roller bearing 120 comprises an inner race 122 and an outer race 124 concentrically disposed about a longitudinal axis 126. A series of barrel shaped rollers 128 engage the races and revolve on axes 130 in an orbital movement around the longitudinal axis 126 as the races rotate relative to each other during operation of the bearing. The roller axes 130 are inclined or angularly related to the longitudinal axis 126 of the bearing thus describing an imaginary conical surface as the rollers revolve and orbit.

A sheet metal separator indicated generally at 132 comprises axially spaced end rings 134 and 136 connected by a series of cross bars 138 defining windows 140 receiving and circumferentially spacing the rollers 128. The end rings 134 and 136 are cylindrical and of equal diameter with the cross bars 138 angularly oriented to provide suitable guidance for the angularly oriented barrel shaped rollers 128. More specifically the angularly oriented cross bars 138 comprise an elongated central portion 142 which is inclined with respect to the longitudinal axis 126 of the bearing 120.

In the second embodiment of my invention, the inclined central portions 142 of the cross bars 138 are located inwardly of the imaginary conical surface defined by the roller axes 130 and have side faces 144 provided with flat roller guiding surfaces 146 which engage the rollers 128 in a line contact. The roller guiding surfaces 146 on adjacent cross bars slant toward each other in the radially inward direction and are spaced to retain the rollers 128 in the windows 140 in the absence of the inner race 124. See FIG. 12. The roller guiding surfaces 146 are shown as extending along the entire length of the inclined central portions 142 so that they guide and retain the rollers 128 for nearly their entire length. The roller guiding surfaces 146, however, need not necessarily be uninterrupted and in some instances separate guiding surfaces near the respective ends of the rollers 128 may be sufficient. In any event the inclined central portions necessarily extend for a majority of the length of the cross bars 138 for adequate roller guidance irrespective of the nature of the roller guiding surfaces 146.

The inclined central portions 142 are connected to the end ring 134 by a generally radial S-shaped portion 150 which protrudes radially inwardly from the end ring 134 in order to provide a transition between the equal cylindrical nature of the end rings 134 and 136 and the inclined nature of the cross bars 138. At the opposite ends the inclined central portions 142 extend right to the other end ring 136 and are connected thereto with slight bends in the radially inward direction. The inclination of the central portions 142 indicated by the lines 152 need not necessarily duplicate that of the roller axes 130. However, in the bearing 120 shown in FIG. 11, the inclination of the central portions 142 is the same as that of the typical roller axis 152 because of the symmetrical nature of the barrel shaped rollers 128.

Referring now to FIGS. 13 and 14, the separator 132 shown in FIG. 11 is made in the following manner. A series of windows 140a is first punched from a flat strip 132a of sheet metal into a "ladder" having flat end bands 134a and 136a interconnected by flat cross bars 138a. The windows 140a are pierced out with localized confronting enlargements 141a at one end thereof such that the opposite side faces at the end portions 150a of the cross bars 138a are relieved for avoiding interference of the completed cage with the rollers 128 and at the same time the end portions 150a of the cross bars are thinned for easier bending later on.

The enlarged central portions 142a of the cross bars 138a are then preferably coined producing slanted surfaces 146a on their side faces which eventually engage the rollers of the bearing in a line contact. After the strip 132a is pierced and coined, the cross bars 138a are then bent so that the portions 142a are inclined with respect to the end bands 134a and 136a and connected to the end band 134a by the upright S-shaped portions 150b formed from the end portions 150a and to the end band 134a by a slight bend. See FIG. 15. An axial section through the cross bar 138a now corresponds to the axial section through the cross bar 138 of the completed separator as shown in FIG. 11.

After the cross bars 138a are so bent, a strip of requisite length is rolled to annular form and the abutting ends are resistance welded as indicated at 158 in schematic FIG. 16.

Referring now to FIG. 17, a third embodiment of my invention is shown in conjunction with an angular contact bearing 220 having barrel shaped rollers 228 and inclined axes 226 similar to the bearing 120 except for the separator 232 which retains the rollers 228 in both radial directions. To this end, the cross bars 238 have their inclined portions consisting of two sections 241 and 243 respectively located radially inward and radially outward of the imaginary conical surface defined by roller axes 226. The sections 241 are connected to the end ring by a slight outward bend and have slanted surfaces 245 on their side faces which narrow the windows 240 in the radially outward direction so that the slanted surfaces 245 retain the rollers 228 in one direction as well as contribute to their guidance. The sections 241 in turn are connected to the sections 243 by generally radial S-shaped portions 250. The sections 243 in turn are connected to the end ring 236 by slight radial bends. The sections 243 have slanted surfaces 247 on their side faces which narrow the windows 240 in the radially inward direction so that the slanted surfaces 247 retain the rollers in the other direction as well as contribute to roller guidance. As shown in FIG. 17, the sections 241 and 243 do not have the same inclinations as the roller axes 226 but preferably converge toward each other to reduce the height of the S-shaped portions 238 and thereby reduce the width of the original blank strip from which the separator is made.

The separator 232 is made from a flat blank strip shown in plan view in FIG. 18. The blank strip windows 240a are punched with localized confronting enlargements 239 at the middle so that the midportions 250a of the cross bars 238a connecting the end bands 234a and 236a have their side faces relieved for non-interference with the rollers and thinned for subsequent bending. The cross bars 238a are also preferably coined to produce the slanted surfaces 245a and 247a which eventually provide the slanted roller guiding and retaining surfaces 245 and 247. The surfaces 245 and 247 are coined from the opposite directions either simultaneously or in separate operations. After the blank is of the form shown in FIG. 18, the cross bars are then bent slightly at their connection to each of the end rings and deeply at the thinned midportions 250a into the configuration shown in FIG. 17. With the cross bars so bent, a strip of requisite length is rolled to annular form and the abutting ends of the strip resistance welded as before.

When completed each of the three sheet metal separators which have been disclosed have the advantages of cylindrical end rings which have not been subjected to any heavy forming pressures and inclined cross bars having a proper orientation for guiding the rollers in an angular contact bearing. The cylindrical end rings provide convenient structure for race retaining structure as illustrated in the first embodiment of my invention and they also provide convenient structure for centering the separator from one of the races if such a feature is desired.

It has been illustrated that a separator in accordance with my invention not only guides the rollers but can be configured to retain the rollers in either or both radial directions. It is also to be understood that the separator can also be configured to simply guide the rollers without any roller retention feature in which case it is preferable to locate the inclined portions of the cross bars on the roller axes. It is further to be understood that my invention is applicable to any angular contact bearing whether the rollers be cylindrical, tapered, barrel shaped or a tapered barrel shape. Further while the method of making the separator has for convenience been described as though an entire strip was punched, then coined, then bent, etc., it is to be understood that this is not a limiting feature as the separator might be made with progressive forming techniques so that several operations are simultaneously performed on different portions of a strip of material.

What is claimed is:

1. An angular contact roller bearing comprising
   relatively rotatable inner and outer races having a common longitudinal axis,
   a plurality of rollers disposed between said races in rollable engagement therewith,
   said rollers having longitudinal axes angularly disposed with respect to said common longitudinal axis of said races about which said rollers respectively revolve during operation of the bearing, and
   a separator rolled to annular form from a strip of sheet metal, said separator having windows receiving said rollers and comprising cylindrical end ring portions of equal diameter disposed on opposite sides of an imaginary conical surface defined by said longitudinal axes, said end ring portions being interconnected by a plurality of cross bars having an asymmetrical configuration and major portions angularly disposed with respect to said common longitudinal axis of said bearing engaging and guiding said rollers along a majority of their lengths.

2. An angular contact roller bearing as defined in claim 1 wherein said major portions are spaced from said imaginary conical surface and have radial faces, each of said radial faces confronting another of said radial faces on an adjacent cross bar in a circumferential spatial relationship which prevents said rollers from passing through therebetween.

3. An angular contact roller bearing as defined in claim 2 wherein said major portions on each cross bar consists of a single inclined section.

4. An angular contact roller bearing as defined in claim 2 wherein said major portions consist of first inclined sections located on one side of said imaginary conical surface and second sections located on the opposite side of said imaginary conical surface, said first and second sections being connected by S-shaped, generally radial portions.

5. A separator for angular contact bearings which is rolled to annular form from a strip of sheet metal comprising axially spaced cylindrical end ring portions of equal diameter concentric with a longitudinal axis, said end ring portions being interconnected by a plurality of cross bars forming roller receiving windows, said cross bars being connected to said end ring portions at locations equidistant from said longitudinal axis and having an asymmetrical configuration, and said cross bars including inclined roller guiding portions angularly disposed with respect to said longitudinal axis for engaging and guiding rollers on axes disposed at an angle with respect to said longitudinal axis and generally radial S-shaped portions connected to the inclined portions and axially aligned therewith whereby production of the separator by rolling a ladder-shaped strip of sheet metal is possible without reducing the diameter of the end ring portions.

6. The separator as defined in claim 5 wherein said inclined roller guiding portions are connected to one of said end ring portions by a slight bend and incline substantially directly from said one end ring.

7. The separator as defined in claim 6 wherein said inclined roller guiding portions are connected to the other of said end rings by said generally radial S-shaped portions.

8. The separator as defined in claim 6 wherein said inclined roller guiding portions comprise first and second sections interconnected by said generally radial S-shaped portions, said first and second sections being connected to said end ring portions respectively by slight bends inclining in opposite radial directions substantially directly from said end ring portions.

9. The separator as defined in claim 5 wherein said inclined roller guiding portions are connected to one of said end ring portions by said generally radial S-shaped portions and to the other of said end ring portions by generally radial S-shaped portions extending in opposite radial direction of aforesaid generally radial S-shaped portions.

10. A method of making a sheet metal separator for an angular contact roller bearing having rollers with longitudinal axes disposed at an angle with respect ot the longitudinal axis of the bearing comprising the steps of
    forming a generally flat ladder shaped strip of stock with end bands connected by cross bars with at least one section thereof thinned in the plane of said strip defining a series of windows with confronting localized enlargements,
    bending said cross bars into an asymmetrical configuration with S-shaped, generally upright portions at said one section and with inclined portions contiguous to said S-shaped upright portions angularly related to said end bands, and
    rolling said strip into a generally annular separator having axially spaced cylindrical end ring portions formed from said end bands, said end ring portions being of equal diameter and concentric about an axis and said inclined portions on said cross bars being angularly disposed with respect to said axis.

11. The method as defined in claim 10 wherein said one section is midway between the ends of said cross bars and wherein said cross bars are bent into a Z-shaped configuration with said S-shaped, generally upright portions projecting above and below said end bands and with said inclined portions comprising first and second sections contiguous to said S-shaped upright portions and connected respectively to said end bands by slight bends.

12. The method as defined in claim 10 wherein said one section is adjacent one end of said cross bars and said cross bars are bent with said S-shaped upright portions projecting in a first single radial direction with respect to said end bands.

13. The method as defined in claim 12 wherein said cross bars are bent with second S-shaped portions adjacent the other ends of said cross bars, said second S-shaped portions projecting in a second single direction with respect to said end bands which is opposite to said first single radial direction.

* * * * *